Oct. 24, 1950 J. H. DAWSON 2,526,811
BISCUIT OR COOKY CUTTER
Filed Nov. 5, 1946
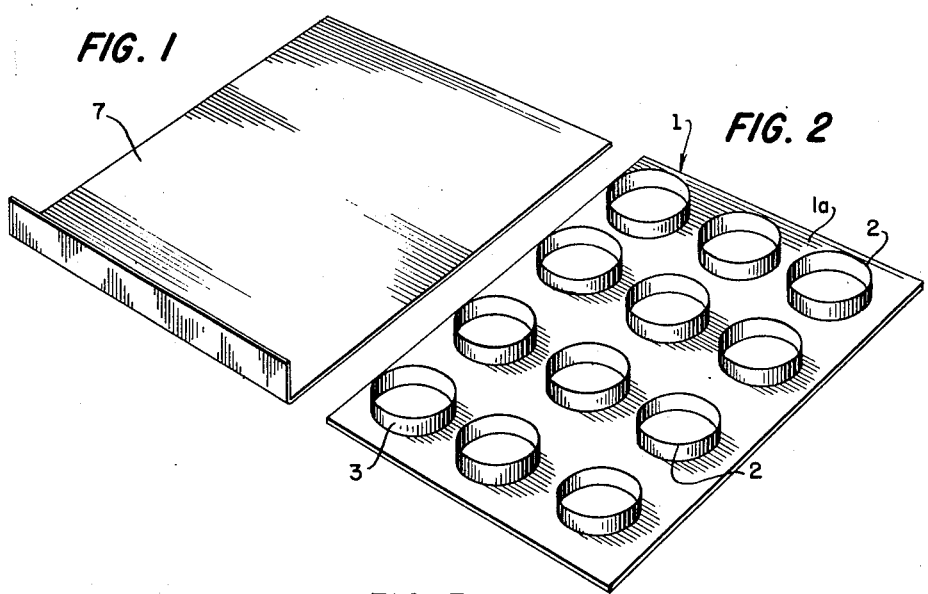
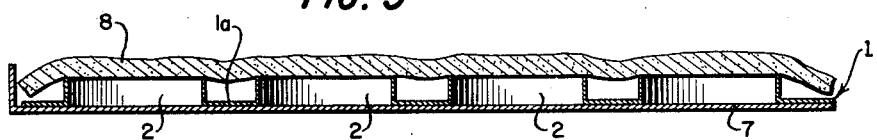
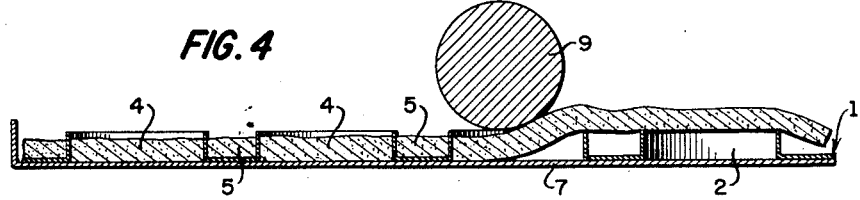
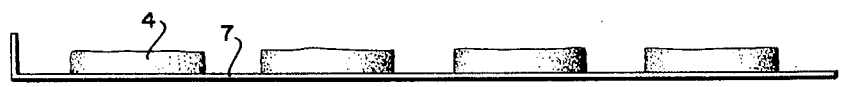
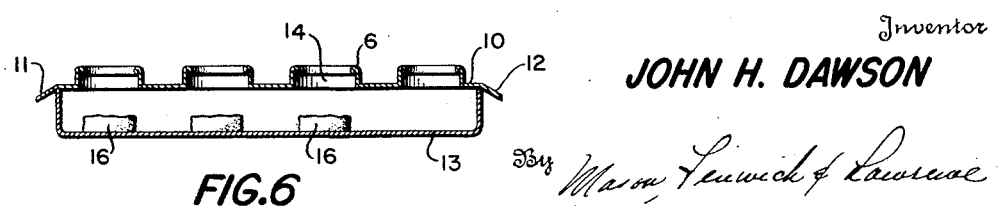
Inventor
JOHN H. DAWSON Patented Oct. 24, 1950

2,526,811

UNITED STATES PATENT OFFICE 2,526,811

BISCUIT OR COOKY CUTTER

John H. Dawson, Rockville, Md.

Application November 5, 1946, Serial No. 707,829

1 Claim. (Cl. 107—20)

This invention relates to a device for cutting raw dough blanks for making biscuits, cookies and the like.

It is common practice to prepare dough blanks for biscuits or cookies by the use of a single hand die for cutting out the individual blanks. Since with these prior devices it is necessary to cut each biscuit or cookie individually, considerable time is consumed in preparing a large batch of cookie or biscuit blanks. When using the prior devices it is not only necessary to pick up the individual blanks and space them in a pan or on a cookie sheet but it is also necessary to separate the trimmings from the blanks. All this takes separate movements and consumes time and energy. In accordance with the present invention a new article of manufacture is provided for cutting and spacing a larger number of dough blanks in one operation and for receiving the trimmings of the dough so that the latter can be quickly removed from between the blanks.

One of the primary objects of the invention is to provide a new article of manufacture in the form of a dough cutter for cutting a predetermined number of blanks of biscuit or cookie dough in one operation.

Another object is to provide an article of manufacture in the form of a kitchen accessory which greatly facilitates the preparation of biscuit or cookie dough blanks.

A still further object is to provide an article of the type described in which the dough blanks can be readily and quickly separated from the trimmings of the dough.

Another object is to provide a die adapted to be used with a cookie sheet for cutting dough blanks for biscuits or cookies and for automatically spacing the blanks on a cookie sheet, the die being constructed and adapted to receive the trimmings from the dough between the blanks so that with one operation the dough blanks will be cut and spaced on the cookie sheet and the trimmings will be received and held by the die.

Other and further objects will become readily apparent from the following description when considered in connection with the accompanying drawings, illustrating an embodiment of the invention, and in which:

Figure 1 is a perspective view of a cookie sheet which may be used with the die made in accordance with this invention to receive the biscuit or cookie blanks in properly spaced relation after they have been cut by the die from a sheet of dough.

Figure 2 is a perspective view of the die which may be placed on a cookie sheet or over the bottom of a pan for cutting cookie or biscuit blanks and spacing them properly and for receiving the trimmings.

Figure 3 is a sectional elevation of the elements shown in Figures 1 and 2 in assembled relation and showing the sheet of dough arranged on top of the die before the dough blanks are cut;

Figure 4 is a view similar to Figure 3 but additionally showing the manner in which the dough blanks are cut by rolling a rolling pin over the top of the die;

Figure 5 is a side elevational view of the cookie sheet of Figure 1 showing the spacing of the dough blanks on the latter after the die with the trimmings has been removed.

Figure 6 is a sectional elevation of a modified form of the invention in which the dough cutting die is adapted to be placed on the upper edges of a pan instead of the cookie sheet shown in Figure 1.

The form of the invention shown for the purpose illustrating the invention comprises a die 1 having a main sheet-like body $1^a$ provided with a plurality of tubular die formations 2 extending transversely thereof. In the form of the invention shown, the die formations 2 are circular and are integral with the main body $1^a$ of the die as it will be apparent that in certain sizes the die can be formed by merely stamping the die formations 2 from a solid sheet of thin metal. In other instances, where making the formations would necessitate drawing the metal beyond its elastic limit, the formations could be formed individually and be secured by welding, soldering or crimping to the sheet-like body $1^a$ in accordance with well known practices.

Although the die formations 2 shown are circular cylinders it will be readily apparent that these could be tubular formations of any desired shape such as stars, crescents, aces, clubs, spades, hearts, letters, numbers, squares, rectangles, and the like. Also, it will be noted that in the form shown the sides 3 of the formations are substantially at right angles to the main body $1^a$ of the die but it will be readily apparent that these sides could be tapered inwardly toward the top so that in a die for cutting circular shapes the formations 2 would be frustrums of cones. With such construction the outside diameter of the dough blanks 4 would be slightly smaller than the base of the formations 2 so that there would not be a tendency for the dough blanks 4 to stick in the inside of the formations 2. There would be no problem in removing the trimmings 5 with such arrangement because the trimmings will readily fall out from between the formations 2 when the die 1 is turned upside down. By another alternate construction, the upper ends of the formations 2 could be provided with small beads 6 as shown in the modified form of Figure 6. Since the diameter of the formations at the beads 6 would be slightly less than the inner diameter of the base of the formations, the dough blanks would readily fall through the die formation and would not stick therein.

As shown in Figures 1 to 5, the die 1 may be used in conjunction with a conventional cookie sheet 7. One way of using the die is to place it on top of the cookie sheet 7 with the projecting formations 2 projecting away from the cookie sheet 7. The biscuit or cookie dough may be prepared in the usual manner and rolled into a sheet form, as indicated at 8, and may be placed on top of the formations 2. As shown in Figure 4, a conventional rolling pin 9 may be used to roll over the top of the formations 2 to sever the blanks of dough 4 from the sheet of dough 8. The dough blanks 4 are cut out by reason of the pinching action between the surface of the roller 9 and the upper edges of the formations 2. It will be readily apparent that the dough blanks will drop onto the cookie sheet 7 and be spaced in accordance with the spacing of the formations 2. It will be readily apparent that the trimmings 5 will drop into the space between the sides of the formations 2 on top of the die 1 and by lifting the latter from the cookie sheet 7 the trimmings will be readily separated from the dough blanks 4, leaving the dough blanks properly spaced on the cookie sheet 7 so that the latter may be placed in an oven and baked in the usual manner.

Instead of the rolling pin 9, it will be readily apparent that any other suitable implement may be used for forcing the dough blanks 4 through the formations 2. For instance, a small bread board (not shown) may be used by merely placing the latter on top of the sheet of dough 8 and applying pressure thereto to force the dough blanks through the formations 2. Although in the method of using the die illustrated in Figures 3 and 4, the latter is placed with the formations 2 extending away from the cookie sheet 7, it will be readily apparent that the die could be reversed so that the outer edges of the projections 2 rest on the cookie sheet. Then, in the same manner, a rolling pin 9, or alternatively a bread board or any other suitable implement, could be used for forcing the dough through the formations 2 to form the dough blanks 4. In this latter method of operation there would be no remaining trimmings since all of the dough would be pinched between the rolling pin 9 or other implement and the die 1 with the result that all of the dough would be forced through the formations 2 and the blanks 4 would be made slightly thicker.

In the modification shown in Figure 6, the main body of the die 10 is provided with depending flanges 11 and 12 for the purpose of centering the die over the upper edges of any suitable pan 13. As previously pointed out, the upper edges of the formations 14 are provided with beads 6 so that the dough blanks 16 cut from a sheet of dough will be sufficiently smaller than the remainder of the formations so that the blanks will readily drop through to the bottom of the pan 13. It will be readily understood that the dough blanks 16 will be spaced on the bottom of the pan in a manner similar to that described above in connection with the previous figures. In this form of the invention it will be preferable to form the body of the die 10 with suitable corrugations pressed into the metal for the purpose of strengthening the latter to resist the force necessary to force the dough through the formations 14. It will be readily apparent that the alternative constructions described in connection with the previous figures would be applicable to this form of the invention. Also, it will be readily apparent that the depending flanges 11 and 12, as shown in Figure 6, could be turned in the opposite direction or any other suitable centering device could be provided for positioning the die 10 on the upper edges of the pan 13 when the die is in reverse position with the formations 14 extending downwardly. The manner of using this modified form of the invention is the same as that described above.

Instead of the integral metal construction shown, the die 1 could be made of plastic material with the formations 2 being joined together by solid or open webs. The interconnecting webs could be joined to the formations 2 intermediate the edges of the formation if desired.

Although the invention has been described in considerable detail, it will be apparent to those skilled in the art that many variations are possible without departing from the inventive concept. It is therefore desired that the invention not be limited except insofar as is made necessary by the prior art and by the appended claim.

Having described my invention, I claim:

As a new article of manufacture, a die for simultaneously cutting a plurality of dough blanks from a sheet of dough, comprising a sheet-like body having a plurality of holes, cutting flanges of equal height bounding said holes, extending from one side of said sheet, said flanges having an internal peripheral bead at the free end which slightly restricts the cross-sectional area of said flanges at their inlet ends.

JOHN H. DAWSON.

REFERENCES CITED

The following references are of record in the file of this patent:

UNITED STATES PATENTS

| Number | Name | Date |
| --- | --- | --- |
| 25,767 | Shrote | Oct. 11, 1859 |
| 65,575 | Howell et al. | June 11, 1867 |
| 139,217 | Webster | May 20, 1873 |
| 601,886 | Crowell | Apr. 5, 1898 |
| 1,184,342 | Govan et al. | May 23, 1916 |
| 1,299,802 | Smith | Apr. 8, 1919 |

FOREIGN PATENTS

| Number | Country | Date |
| --- | --- | --- |
| 4,871 | Norway | Aug. 24, 1896 |
| 29,295 | Great Britain | Dec. 31, 1904 |